Figure 1:
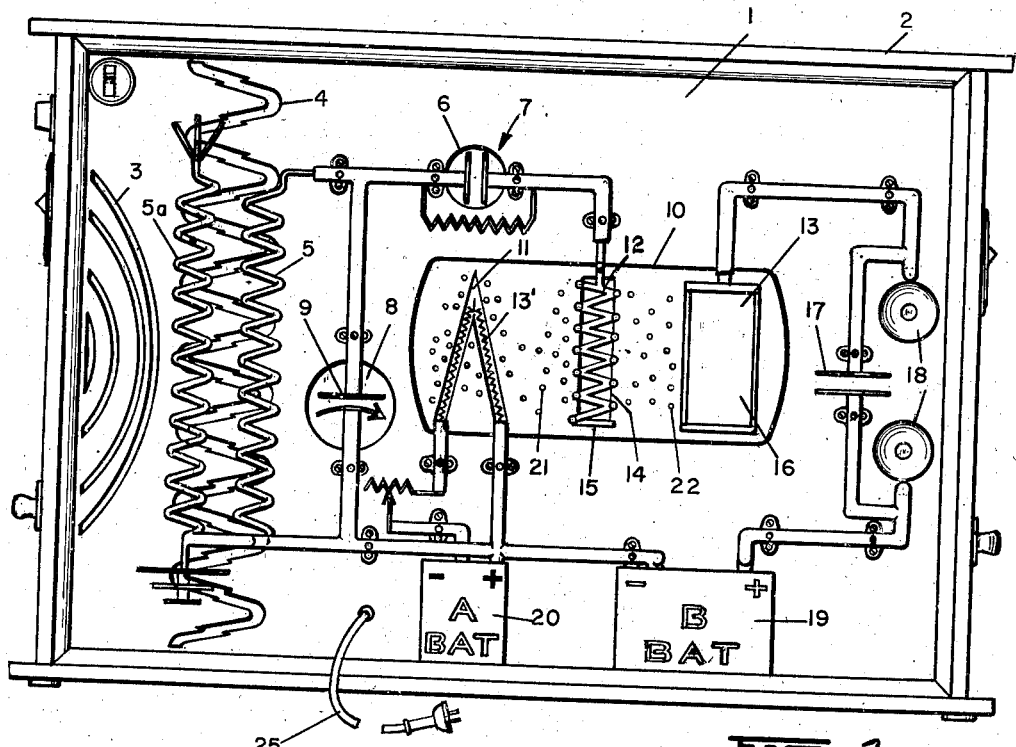

June 4, 1940.                    A. L. DAUGHERTY                    2,203,594
                              RADIO INSTRUCTION DEVICE
                               Filed Aug. 16, 1939                2 Sheets-Sheet 1

INVENTOR.
ALBERT L. DAUGHERTY
BY Oberlin, Limbach & Day
ATTORNEYS

Patented June 4, 1940

2,203,594

UNITED STATES PATENT OFFICE 2,203,594

RADIO INSTRUCTION DEVICE

Albert L. Daugherty, La Grange, Ill.

Application August 16, 1939, Serial No. 290,527

15 Claims. (Cl. 35—19)

This invention relates, as indicated, to a radio instruction device, and more particularly to a type of apparatus which may be employed for the purpose of illustrating visually the progression of an electrical signal or the like through a sending or receiving apparatus. I have found that when explaining the function and operation of a radio sending or receiving set to those not fully familiar with the principles of radio, such as students, that unless some means is provided for graphically illustrating what actually takes place in the set the student has difficulty in grasping the explanation and many times entirely fails to comprehend it. I have, therefore, provided an instruction device which may be operated either independently or in conjunction with an oral explanation of the principles of radio so that the student may have not only an oral scientific explanation of the principles involved, but may also have before him a visual representation of what actually occurs in a radio set. It has been demonstrated that by such visual representation of the progression of a radio signal, for example, through a receiving set, that the student is capable of not only more quickly grasping the principles involved, but also retains such principles much longer and, what is more important, much more completely than when an oral explanation of the principles is relied upon, even though such oral explanation may be supplemented by inanimate diagrams or charts.

It is a principal object of my invention, therefore, to provide a radio instruction device of the character described which is capable of representing visually and in animated form the progression of a radio signal through a sending or receiving set.

It is a further object of this invention to provide a device of the character described which is fully automatic in its operation and which is so arranged that components thereof may be separately controlled if, for instance, a particular feature of operation of a radio circuit is to be accented.

Other objects of my invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
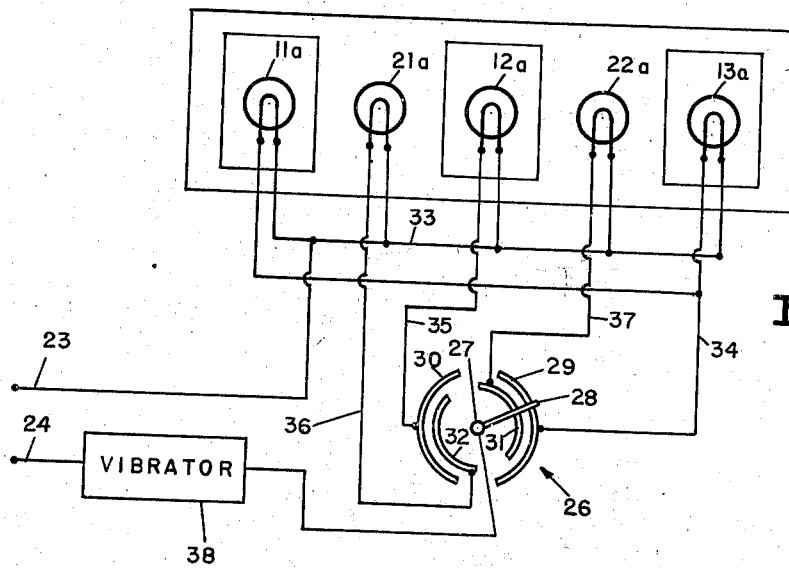
Figure 3:
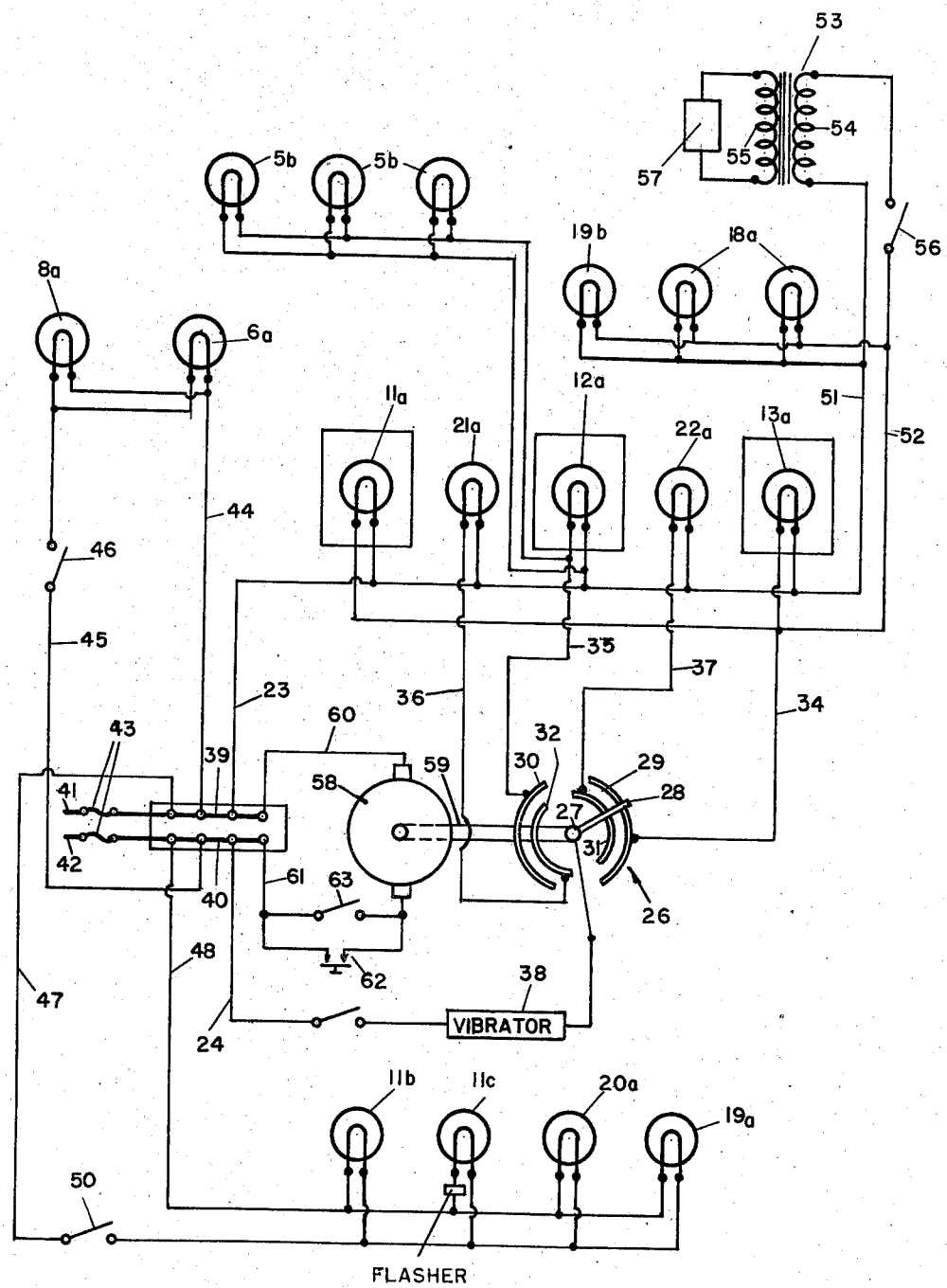

In said annexed drawings:

Fig. 1 is a front elevational view of a device constructed in accordance with the principles of my invention and showing the parts which are open to view and which represent the conventional components of a simple one-tube radio receiving set equipped with ear phones;

Fig. 2 is a schematic wiring diagram of the control circuit by which the most essential components of the system, as illustrated in Fig. 1, may be successively illuminated in the order of progression that the impulses set up by which the radio signals are transmitted through the conventional set; and Fig. 3 is a more complete schematic wiring diagram of the control circuit by which all of the components, as illustrated in Fig. 1, may be illuminated in proper succession.

Referring now more specifically to the drawings and more especially to Fig. 1, the device here illustrated is a cabinet, only the front of which is shown, and which front carries representations of the conventional components of a single tube radio receiving set. The panel 1 on which the various components are thus mounted may be carried in a suitable box, generally indicated at 2, in the rear portion of which is housed the electrical control wiring and devices which are schematically illustrated in Figs. 2 and 3. Since such schematic representation of the control wiring and devices is much more clear than any actual illustration of the same, no actual illustration of the rear of the panel 1 and the control circuits is given.

Referring now more specifically to Fig. 1, therefore, the panel A is provided with a plurality of slots 3, at the left hand end thereof, these slots being so formed as to simulate an incoming radio wave. The slots 3 are cut through the panel 1 and on the rear face of the panel are preferably covered with some transparent material capable of transmitting light of a characteristic color, such as green.

Immediately adjacent the slots 3 is a slot 4 drawn to represent the incoming wave in the receiving coils of the set. The receiving coils of the set are represented by tubes 5 and 5a which are mounted on the face of the panel 1 and in slightly spaced relation thereto.

At 6 there is another opening through the panel 1 in front of which is mounted, by means of plates and copper tubing, a conventional representation of a grid leak and condenser 7.

Another opening, 8, in the panel has mounted in front of it a conventional representation of a tuning condenser 9.

In the center of the panel 1 is an area, generally indicated at 10, which is to represent the envelope of a vacuum tube. A suitable capsule made of transparent material, such as Cellophane, glass, or the like, may be mounted over the area 10 in order to further simulate the appearance of the vacuum tube envelope.

Within the area 10 are mounted a representation of a filament 11, a grid 12, and a plate 13. The filament 11 comprises angularly related slots formed in the panel 1, covered on the back by suitable translucent material of significant color, and the coiled representation 13' of the filament itself may be secured either by painting the same in a contrasting color on the translucent material covering the slot 11 or an actual filament wire may be mounted in such slot.

The representation of the grid 12 may be secured quite effectively by forming an elongated opening 14 in the panel 1 and superimposing thereon a zig-zag arrangement of copper tubing 15. The opening 14 will of course be covered by a translucent material of a characterizing color.

The plate of the tube, indicated at 13 in Fig. 1, may be very effectively simulated by the use of a translucent mirror 16, i. e., a mirror of well known construction which is capable of transmitting and reflecting approximately equal amounts of light. Thus when not illuminated from the back the plate appears to be a mirror and when illuminated from the back has the appearance of being energized.

A phone condenser 17 is likewise fashioned from metallic plates connected with suitable tubing to simulate the leads extending therefrom and the phones 18 may be actual phones mounted on the face of the panel. The panel will also preferably include a box 19, in the forward wall of which are openings forming the representations as illustrated in the drawing simulating the appearance of a B battery to which leads, represented by copper tubing, extend to the other components of the set. A second and somewhat smaller box 20 is also mounted on the face of the panel with the forward wall of such box also provided with cut-out openings indicating that such box is to represent the A battery and which A battery is also shown as connected to the components of the set by tubing. Lights are placed behind the various openings formed in the panel 1 and the boxes 19 and 20, and as these lights are energized in proper predetermined sequence the progression of a signal through the conventional components of the set may be demonstrated.

At this point I refer to the groups 21 and 22 of small openings formed through the panel in the vicinity of the filament and plate of that area which represents the space within the envelope of the vacuum tube. As these groups of openings are illuminated from behind they simulate the electrons of the electron stream in the tube.

With the foregoing brief description of the panel and the representations carried thereby of the essential components of a radio receiving set, I now turn to a brief description of the fundamental control circuit illustrated in Fig. 2 by which the most important elements of such combination may be illuminated in the proper sequence.

In Fig. 2 the leads 23 and 24 denote the power line, such as is illustrated by the cord 25 in Fig. 1. Now as previously explained, the slots or openings 13 and 14 are covered by means of a suitable translucent material of appropriate color and behind each of these areas there is mounted a lamp for the purpose of illuminating these elements of the structure. Another lamp is mounted behind the plate 13 and separate lamps are mounted behind the groups of openings 21 and 22. All of these lamps are suitably light-shielded so that light from any one lamp will not spill over into the area intended to be illuminated by another lamp.

In Fig. 2 the lamp behind the filament area is designated by the ordinal 11a, the lamp behind the grid element 12 is designated by the ordinal 12a, the lamp behind the plate element 13 is designated by the ordinal 13a, the lamp behind the group of openings 21 representing one group of electrons is represented by the ordinal 21a, and the lamp behind the group of openings 22 representing another group of electrons is represented by the ordinal 22a.

In order to successively energize the several lamps in the proper sequence, a motor-driven switch, conventionally represented at 26, may be employed. This switch comprises a motor-driven spindle 27, a contact arm 28 fixed to the spindle 27, and contact rings 29, 30, 31 and 32. The spindle 27 will be driven by a suitable motor energized by some outside source of power, and since constructions of this character are well known to those familiar with the art, a further and more detailed illustration thereof is believed unnecessary. All of the lamps in the bank are connected to a common lead 33 which, as indicated, is connected to one side, 23, of the power line. The other side, 24, of the power line is connected to the spindle 27, or more particularly, to the contact arm 28 carried thereby. The lamps 11a and 13a are connected in parallel by the lead 34 to the switch segment 29. The lamp 12a is connected by the lead 35 to the switch segment 30. The lamp 21a is connected by the lead 36 to the switch segment 32 and the lamp 22a is connected by the lead 37 to the switch segment 31. A conventional vibrator 38 is connected in series in the line 24 which leads to the contact arm 28. This vibrator may be of any conventional construction and adapted when placed in series in the line 24 to periodically interrupt the circuit therethrough so that instead of being constantly energized, the several lamps of the bank, when in the circuit, are caused to flicker, thus further simulating the effect of a radio impulse passing through the components of the set upon the panel illuminated thereby.

The schematic wiring diagram shown in Fig. 3 represents the complete circuit for the illumination of all of the elements shown in the face of the panel in Fig. 1. The wiring diagram of Fig. 2 merely included the circuit for the illumination of the area generally indicated at 10 and which simulates the several components of the vacuum tube. The same elements of Fig. 2 are included in Fig. 3 and like reference characters are employed to designate like parts so that a further description of such common subject matter will be unnecessary.

A bank of lights 5b, connected in parallel with the lamp 12a behind the grid 12, is positioned behind the panel in the area occupied by the induction coils 5 and 5a. These lights 5b are periodically illuminated simultaneously with the illumination of the grid 12a. In the arrangement illustrated in Fig. 3 the power leads 23 and 24 are connected to suitable taps on bus bars 39 and 40 respectively which are connected to the main power lines 41 and 42 by means of fuses such as 43. Connected across the bus bars 39 and 40 are leads 44 and 45 and connected to such leads in parallel are lamps 6a and 8a respectively positioned behind the openings 6 and 8 respresenting the condenser. A manually operated switch 46 is included in the lead 45 for the purpose of controlling the energization of these lamps.

Another set of leads 47 and 48 are connected across the bus bars 39 and 40 and to these leads are connected in parallel lamps 19a, 20a, 11b and 11c. A switch 50 in this circuit controls the energization of these lamps. The lamp 19a is positioned in the B battery box 19 for the purpose of illuminating the same in the manner previously described, the lamp 20a is mounted in the A battery box 20 and the lamps 11b and 11c are positioned behind the panel in the area occupied by the slots 11. As indicated on Fig. 3, a flasher of conventional construction is included in series with the lamp 11c so that a part of the illumination of the filament slots is periodic, depending upon the frequency of the flasher, and so that the pulsating character of the electrons emitted by the hot filament may be simulated. This independent circuit shows the necessity of heating the filament to make the tube operate.

Leads 51 and 52 are respectively connected to the common return lead 23 and the switch control lead 34. To these leads are connected lamps 18a in parallel, these lamps being positioned behind the panel in line with the openings through the central areas of the phones 18, and lamp 19b in B battery box 19. A transformer, generally indicated at 53, is likewise connected to the leads 51 and 52, such transformer consisting of a primary winding 54 and a secondary winding 55. Energization of the transformer is controlled by a manually operated switch 56.

Connected across the secondary winding 55 of the transformer is a buzzer 57 which, when the switch 56 is closed, will produce an audible signal synchronously with the energization of the lamps 18a which illuminate the openings through the phones 18.

A motor, diagrammatically illustrated at 58, is shown connected by means of a shaft 59 to the spindle 27 of the switch 26. The motor 58 is energized by means of leads 60 and 61 connecting the same to the bus bars 39 and 40. A push button type of switch 62 and a knife blade type switch 63 are connected in parallel in the lead 61 to the motor 58 so as to make more flexible the manner in which the energization of the motor may be controlled. Thus if the switch 26 is to be operated continuously the knife blade switch 63 will be closed, whereas if the motor is to be operated intermittently and under the direct control of the operator the switch 63 may be left open and the push button switch 62 employed for this purpose.

From the foregoing description it will be observed that I have provided a radio construction and display device in which the several components of a simple radio circuit are represented in such a way as to most clearly simulate the actual construction and function of the parts of an actual set.

From a description of the wiring diagrams of the control circuit employed with my apparatus it will be observed that almost all functions of the set as a whole, as well as the component parts, are illustrated, not only as independent components, but as elements of a cooperative combination and in such an order as to simulate the progression of a radio signal through an actual radio receiver.

The various openings in the panel 1 behind the representations of the several components of the set will preferably be covered with some colored transparent materials so that the various components are illuminated with different colors. In this way a conventional color scheme employed in radio wiring may be carried out if desired. This transparent material by which the various color effects may be secured may be of any suitable substance such as glass, Celluloid, etc.

By a simple change in the type of representations occurring on the face of the panel 1 my apparatus may be converted to demonstrate the function and operation of a radio sending set or of a receiving set using more than one tube. It will also be apparent to those familiar with the art that by a simple modification of the principles of my invention a panel may be constructed generally similar to the arrangement illustrated in Fig. 1 but which may include the various components of a circuit for the receiving and sending of television. It is also within the contemplation of my invention to construct a panel such as illustrated in Fig. 1 and provided with an illumination system such as is illustrated in Fig. 3 which combines in a single unit a compound system such as is employed in television for the sending and receiving of both audio and video waves.

The apparatus above described may be housed in a suitable box, preferably provided with a removable front cover which may be taken off to expose the arrangement as illustrated in Fig. 1. It will be found advantageous to provide on the inner face of such removable cover an actual wiring diagram of a radio cricuit of the type which is represented on the front face of the apparatus as viewed in Fig. 1, for example. In this way the elements of an actual set may be readily compared with the representations thereof which are set up on the panel which is used for instruction purposes.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device for teaching the princip'es of radio wave conversion, a series of concentric members adapted to represent incoming waves and means to illuminate said arcuate members in sequence beginning with the one nearest the center of curvature.

2. In a device for teaching the principles of radio wave conversion, the article of claim 1, three flat prongs extending from a common base adapted to represent an aerial and three circular plates adapted to represent a ground, said prongs and plates being joined by a coiled member, adapted to represent a receiving coil, said coiled member being positioned adjacent the outermost arcuate member.

3. In a device for teaching the principles of radio wave conversion, concentric arcuate members adapted to represent incoming electro-magnetic waves, a coiled member adapted to represent a receiving coil, a zig-zag slot adapted to represent radio frequency impulses, said slot being located behind said member and means to sequentially illuminate said arcuate members and slot whereby the change in wave form may be represented.

4. In a device for teaching the principles of radio wave conversion, concentric arcuate members adapted to represent incoming electro-magnetic waves, a coiled member adapted to represent a receiving coil, a zig-zag slot adapted to represent radio frequency impulses, said slot being located behind said member and means to sequentially illuminate said arcuate members and slot whereby the change in wave form may be represented, said slot having a jagged contour adapted to indicate voice modulations.

5. In a device for teaching the principles of radio wave conversion, a panel, rod-like members mounted on one side of said panel adapted to represent wiring, said members terminating in flat spaced plates to represent a condenser, said panel having an opening therein and said plates being mounted immediately over said opening and illuminating means being mounted on the other side of said panel, behind said opening adapted when energized to indicate the passage of current through said condenser.

6. In a device for teaching the principles of radio wave conversion, a panel, a V-shaped slot in said panel adapted to represent the filament of a tube and means to illuminate said slot from the rear of said panel, adapted when energized to indicate the passage of current through said filament.

7. In a device for teaching the principles of radio wave conversion, a panel, a V-shaped slot in said panel adapted to represent the filament of a tube, said slot having a coil wire, adapted to represent a filament wire, mounted therein and said panel having small apertures therein surrounding said slot and adapted to represent electrons within said tube, and means to illuminate said slot and electrons, adapted when energized to indicate the passage of impulses through said tube.

8. In a device for teaching the principles of radio wave conversion, a panel, a substantially rectangular opening in said panel adapted to represent the grid of a tube, and a zig-zag strip of material lying immediately over said opening, adapted to represent the grid wire of a tube and means to illuminate said opening, adapted when energized to indicate the passage of current through said grid.

9. In a device for teaching the principles of radio wave conversion, a mirror adapted to represent the plate of a tube said mirror being translucent and illuminating means mounted behind said mirror and adapted to indicate heating of said plate when said means are energized.

10. In a device for teaching the principles of radio wave conversion, a series of concentric arcuate members adapted to represent incoming electro magnetic waves and means to illuminate said arcuate members, a coiled rod adapted to represent a receiving coil, a zig-zag member adapted to represent the incoming radio frequency wave, said zig-zag member being located behind said coiled rod and means to illuminate said arcuate members and said zig-zag member in sequence whereby conversion of one form of wave to the other may be indicated.

11. In a device for teaching the principles of radio wave conversion, a panel, a series of arcuate members adapted to represent incoming waves and means to illuminate said arcuate members, a coiled rod adapted to represent a receiving coil, a zig-zag slot adapted to represent the incoming wave, said slot being located behind said coiled rod and means to illuminate said slot, a V-shaped slot in said panel adapted to represent the filament of a tube and means to illuminate said slot from the rear of said panel, said various illuminating means being sequentially operable whereby travel of a wave through said device may be indicated.

12. In a device for teaching the principles of radio wave conversion, a panel, a coiled rod adapted to represent a receiving coil, a zig-zag slot adapted to represent the incoming wave, said slot being located behind said coiled rod and means to illuminate said slot, a V-shaped slot in said panel adapted to represent the filament of a tube and means to illuminate said slot, a substantially rectangular opening in said panel adapted to represent the grid of a tube, and a zig-zag strip of material lying immediately over said opening adapted to represent the grid wire and means to illuminate said opening, said various illuminating means being sequentially operable whereby the passage of an electric signal through the various components mentioned may be indicated.

13. In a device for teaching the principles of radio wave conversion, a panel, a series of arcuate slots adapted to represent incoming electromagnetic waves and means to illuminate said arcuate members, a coiled member adapted to represent a receiving coil, a zig-zag slot adapted to represent the incoming audio or radio frequency wave, said slot being located behind said tubing and means to illuminate said slot, a V-shaped slot in said panel adapted to represent the filament of a tube and means to illuminate said slot, a substantially rectangular opening in said panel adapted to represent the grid of a tube, and a zig-zag strip of material lying immediately over said opening adapted to represent the grid wire, a mirror adapted to represent the plate of a tube, said mirror being translucent and illuminating means mounted behind said mirror to indicate heating of said plate when said means are energized, said various illuminating means being sequentially operable and adapted when energized to indicate the passage of an electric impulse through said device.

14. In a device for teaching the principles of radio wave conversion, a panel, a series of arcuate slots adapted to represent incoming electromagnetic waves and means to illuminate said arcuate slots, coiled tubing adapted to represent a receiving coil, a zig-zag member adapted to represent the incoming audio or radio frequency wave, said member being located behind said tubing and means to illuminate said member, a V-shaped slot in said panel adapted to represent the filament of a tube and means to illuminate said slot, a substantially rectangular opening in said panel adapted to represent the grid of a tube, and a zig-zag strip of material lying immediately over said opening adapted to represent the grid wire, a mirror adapted to represent the plate of a tube, said mirror being translucent and illuminating means mounted behind said mirror to indicate heating of said plate when said means are energized, said various illuminating means being sequentially operable whereby progression of an electric impulse through said device may be indicated, and in separate circuits so that the device may be stopped while any one element is illuminated.

15. In a device for teaching the principles of radio wave conversion, a panel, a series of arcuate slots in said panel adapted to represent incoming waves and means to illuminate said arcuate slots, coiled tubing to represent a receiving coil, a zig-zag slot adapted to represent the incoming wave, said zig-zag slot being located behind said tubing and means to illuminate said zig-zag slot, a V-shaped slot in said panel adapted to represent the filament of a tube and means to illuminate said slot, a substantially rectangular opening in said panel adapted to represent the grid of a tube, and a zig-zag strip of material lying immediately over said opening, adapted to represent a grid wire, a mirror adapted to represent the plate of a tube, said mirror being translucent and illuminating means mounted behind said mirror adapted to indicate heating of said plate when said means are energized, said various illuminating means being sequentially operable whereby progression of an electric impulse through said device may be indicated, and in separate circuits so that the device may be stopped while any one element is being illuminated, and a motor driven multiple switch adapted to control said circuits.

ALBERT L. DAUGHERTY.